United States Patent [19]

Cunningham et al.

[11] Patent Number: 5,701,327
[45] Date of Patent: Dec. 23, 1997

[54] SATURABLE BRAGG REFLECTOR STRUCTURE AND PROCESS FOR FABRICATING THE SAME

[75] Inventors: John Edward Cunningham, Lincroft; William Young Jan, Scotch Plains; Wayne Harvey Knox, Rumson; Sergio Tsuda, Red Bank, all of N.J.

[73] Assignee: Lucent Technologies Inc., Murray Hill, N.J.

[21] Appl. No.: 640,377

[22] Filed: Apr. 30, 1996

[51] Int. Cl.$^6$ .............................. H01S 3/08; H01L 21/20; H01L 29/06; G02F 1/03

[52] U.S. Cl. .................. 372/99; 372/18; 372/98; 372/92; 372/21; 437/51; 437/126; 437/129; 257/18; 359/248

[58] Field of Search ......................... 372/11, 18, 43, 372/49, 50, 92, 99, 98, 107, 108, 21; 437/51, 126, 129, 110, 131, 132, 128; 257/14, 15, 18, 28; 359/247, 248, 589

[56] References Cited

U.S. PATENT DOCUMENTS

| | | | |
|---|---|---|---|
| 4,147,409 | 4/1979 | Apfel | 372/99 X |
| 5,012,486 | 4/1991 | Luryi et al. | 372/45 |
| 5,136,345 | 8/1992 | Kasahara | 372/99 X |
| 5,229,627 | 7/1993 | Kosaka | 257/85 |
| 5,237,577 | 8/1993 | Keller et al. | 372/11 |
| 5,257,140 | 10/1993 | Rogers | 372/99 X |
| 5,315,430 | 5/1994 | Brennan et al. | 359/248 |
| 5,351,256 | 9/1994 | Schneider et al. | 372/45 |
| 5,416,583 | 5/1995 | Sanzari | 372/99 X |
| 5,493,577 | 2/1996 | Choquette et al. | 372/46 |

*Primary Examiner*—Brian Healy
*Attorney, Agent, or Firm*—Brian K. Dinicola; Steven R. Bartholomew

[57] ABSTRACT

Low optical loss and simplified fabrication are achieved by a nonlinear reflector which incorporates one or more semiconductor quantum wells within an n half-wavelengths strain relief layer (where n is an odd integer greater than zero) that is formed on a standard semiconductor quarter wave stack reflector. Growth of the half-wavelength layer is controlled so that dislocations are formed in sufficient concentration at the interface region to act effectively as non-radiative recombination sources. After saturation, these recombination sources remove carriers in the quantum well before the next round trip of the optical pulse arrives in the laser cavity. The nonlinear reflector is suitable for laser modelocking at the high wavelengths associated with many currently contemplated telecommunications applications and provides, at such wavelengths, an intensity dependent response that permits it to be used for saturable absorption directly in a main oscillating cavity of a laser. Saturation intensity of the nonlinear reflector and thereby related laser modelocking properties can be controlled by disposing the quantum well(s) at a particular position within the strain relief layer.

24 Claims, 3 Drawing Sheets

SATURABLE BRAGG REFLECTOR STRUCTURE AND PROCESS FOR FABRICATING THE SAME

TECHNICAL FIELD

This invention relates to semiconductor devices and, more particularly, to an intensity dependent reflector for use in modelocking lasers for the generation of ultrashort optical pulses.

BACKGROUND OF THE INVENTION

The short duration optical pulses generated by laser modelocking are useful for high speed signal processing and data communications and are commonly called ultrashort pulses because they exhibit pulse widths in the picosecond and sub-picosecond ranges. The use of semiconductor saturable absorbers to passively mode lock solid state lasers has proven to be a practical method for the generation of ultrashort optical pulses. Semiconductor structures are particularly attractive for this purpose since they are inexpensive, compact, can be designed to operate over wide spectral ranges, and have fast response times.

A saturable absorber comprises a non-linear reflector element which is placed either within a lasing optical cavity or in an external optical cavity coupled to a lasing cavity. Because its opacity changes as a function of the intensity of incident radiation at a particular wavelength, the saturable absorber functions as a shutter to the incident radiation. All weak incident radiation at a particular wavelength is absorbed by a saturable absorber. Incident radiation reaching a sufficiently high level of intensity—known as the saturation intensity—passes through the saturable absorber. In general, attenuation caused by the absorber is relatively low because the absorber is saturated into a transparent state at the desired wavelength.

Semiconductor saturable absorbers have been fabricated for narrowband and broadband response. Bulk semiconductor material and multiple quantum well heterostructures have been used for narrowband absorption applications while specially graded bandgap multiple quantum well heterostructures have been developed for broadband applications. In the quantum well realizations of such absorber devices, the quantum well heterostructure have been grown on a semiconductor quarter-wave stack reflector. In another configuration, known as an anti-resonant Fabry-Perot saturable absorber, a thin film oxide partial reflector stack was deposited on a quantum well heterostructure to form a Fabry-Perot etalon with the semiconductor quarter-wave stack reflector. For the latter device, the saturable absorber element (MQW) responds to radiation at wavelengths in the anti-resonant portion of the Fabry-Perot etalon response characteristic. This device produces weak coupling with the laser cavity and introduces less loss than other multiple quantum well devices used for mode locking the laser. Unfortunately, the anti-resonant Fabry-Perot saturable absorber requires significant additional device processing and optimization for its realization.

In U.S. patent application Ser. No. 08/404,664, pending, filed by W. Knox on Mar. 15, 1995, entitled SATURABLE BRAGG REFLECTOR and assigned to Lucent Technologies Inc., assignee of the present application, there is described a new, monolithic semiconductor structure which has been observed to perform intracavity passive modelocking. An illustrative absorber structure disclosed by Knox is fabricated by growing a single GaAs quantum well (QW) within a high reflectivity GaAs/AlGaAs Bragg reflector stack. Unlike previous saturable absorber realizations, this absorber structure did not require any post-growth processing steps. The absorber described by Knox in the above-identified patent application has been successfully employed to modelock a diode pumped Cr:LiSAF laser—yielding 100 fs pulses at 850 nm. In so doing, the structure exhibited very low loss, a highly desirable characteristic since solid-state lasers generally exhibit low gain due to their small emission cross sections, and diode-pumped lasers exhibit especially low gain. Disadvantageously, however, the absorber structures described by Knox are not suited for operation at the much longer wavelengths associated with currently contemplated telecommunications applications (e.g., 1300 nm, 1550 nm, etc.).

As noted above, the two components that comprise a Saturable Bragg Reflector (BR) are a highly reflective mirror stack (>99%) and one or more quantum wells which act(s) as the absorbing medium. While these components can be fabricated in a straightforward manner for 850 nm applications, as shown by Knox, extension of existing techniques to the fabrication of absorber structures capable of modelocking a laser operating at the substantially higher wavelengths associated with telecommunications applications presents several challenges. Structures capable of operating at a typical communications wavelength (e.g. 1550 nm), are generally grown on InP substrates. Since there is no binary semiconductor system nominally lattice matched to InP, however, any useful heterostructures grown on InP must be grown under tightly controlled, lattice-matched conditions. Moreover, the difference in the index of diffraction, $\Delta n$, between the various compounds that can be used to compose a Bragg reflector is very low (on the order of 0.12 at 1550 nm). As such, a very large number (e.g., 40) of thick (e.g. 240 nm) periods must be incorporated into the Bragg reflector to achieve greater than 99.5% reflectivity—resulting in an overall epi thickness of over 6 min. The above factors make the growth of high reflectivity mirrors on InP substrates an extremely difficult and time consuming task.

SUMMARY OF THE INVENTION

The aforementioned deficiencies are addressed, and an advance is made in the art, by employing heteroepitaxial growth of InP-based compounds on GaAs substrates to yield high quality non linear reflector structures. Structures realized in this manner require no post growth processing and have been successfully utilized to passively modelock both $Cr^{4+}$:YAG and Er-Yb:fiber lasers, both of which are of interest as laser sources to the telecommunication community.

According to the invention, low optical loss and simplified fabrication are achieved by a nonlinear reflector which incorporates one or more semiconductor quantum wells within an n half-wavelengths strain relief layer (where n is an odd integer greater than zero) that is formed on a standard semiconductor quarter wave stack reflector. Growth of the half-wavelength layer is controlled so that dislocations are formed in sufficient concentration at the interface region to act effectively as non-radiative recombination sources. After saturation, these recombination sources remove carriers in the quantum well before the next round trip of the optical pulse arrives in the laser cavity. The presence of these recombination sources may explain ultra-fast response times that have been observed during investigation of structures fabricated in accordance with the present invention. As will be readily appreciated by those skilled in the art, devices capable of such response times are of tremendous value as WDM sources in applications involving multi-wavelength communications.

The nonlinear reflector is operable at the high wavelengths associated with many currently contemplated telecommunications applications and provides, at such wavelength, an intensity dependent response that permits it to be used for saturable absorption directly in a main oscillating cavity of a laser. Saturation intensity of the nonlinear reflector and thereby related laser modelocking properties can be controlled by disposing the quantum well(s) at a particular position within the strain relief layer.

According to an illustrative embodiment of the present invention, one or more InGaAs/InP quantum wells are grown heteroepitaxially directly on a high reflectivity AlAs/GaAs mirror structure which structure, in turn, is formed on a GaAs substrate. The InP strain relief layer containing the one or more InGaAs/InP quantum wells is grown to an optical thickness of λ/2(one half of an optical wavelength) so that the associated optical transfer matrix element effectively becomes unity, which in turn preserves the high reflectivity state of the structure. The temperatures employed during growth of the strain relief layer are selected such that an interface containing a high number of dislocations is formed between the mirror structure and the strain relief layer. The QW's lie in this high defect region. While one might reasonably expect such a result to be undesirable, the inventors herein have discovered that the opposite is true. Surprisingly, QW's fabricated in this manner exhibit photoluminescence (PL) of remarkably high quality and, as well, good mode locking properties.

BRIEF DESCRIPTION OF THE DRAWING

A more complete understanding of the invention may be obtained by reading the following description of specific illustrative embodiments of the invention in conjunction with the appended drawing in which.

DETAILED DESCRIPTION

As indicated in the Background section above, the growth of high reflectivity mirrors on InP substrates has heretofore been an extremely difficult and time consuming task, making it commercially impractical to produce a non-linear reflector that is suitable for many applications currently contemplated in the telecommunications field. The present invention is, in substantial part, based on the recognition by the inventors herein that high reflectivity Bragg mirrors of GaAs and AlAs heteroepitaxially grown on GaAs substrates can be advantageously employed in a manner that allows the problems associated with the growth of such structures directly on InP to be entirely avoided.

The heteroepitaxial growth of InP on GaAs has been performed previously by others. Using metal-oxide chemical vapor deposition (MOCVD), for example, A. G. Dentai et al. have demonstrated that high quality InP can be grown directly on GaAs despite the relatively large mismatch (~3.8%). "MOVPE InGaAs/InP Growth Directly on GaAs Substrates", Electron. Lett. 22, 1186 (1986). Moreover, InP-based devices such as detectors and transistors grown directly on GaAs substrates have been reported to perform comparably to devices gown on InP substrates. See, for example, an article by A. G. Dentai et al entitled "InGaAs P-I-N Photodiodes gown on GaAs Substrates by MOVPE", Electron. Lett. 23, 38 (1987). During the aforementioned MOCVD process, a substrate temperature of 650 C is usually maintained throughout the growth to ensure cracking of the organometallic sources at the wafer surface.

In order to reduce defects arising from mismatched growth in structures of the type described by Dentai et at., an InP buffer layer at least one micron thick is grown between the GaAs substrate and the device layers. In the instant invention, however, the growth of so thick a buffer layer is not possible. Specifically, an unacceptable loss in reflectivity would result from the difference in dielectric coefficients between the GaAs and InP materials.

A non-linear or saturable Bragg reflector constructed in the manner taught by Knox in the above-identified co-pending patent application employs a quarter wave stack dielectric reflector having a high reflectance which, in turn, incorporates one or more quantum wells disposed at predetermined location(s) within the reflector to provide the nonlinear characteristic for the reflector. This structure acts as a low loss saturable absorber which can be utilized directly within the main lasing cavity of a laser such as a solid state laser. The position of the quantum well, along with other factors, determines the saturation intensity of the saturable reflector. The present invention differs from the arrangement taught by Knox in that the quantum wells are formed within a half-wavelength strain relief layer (one half of an optical path length) that is grown or otherwise formed on the quarter wave stack dielectric reflector.

Figure 1:
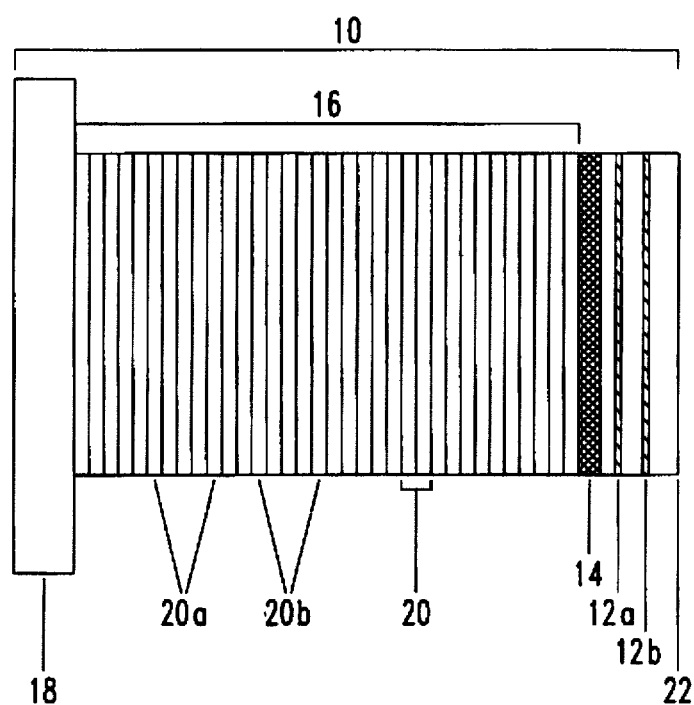
FIG. 1 is a cross-sectional view of a non-linear reflector structure constructed in accordance with an illustrative embodiment of the present invention.

An exemplary non-linear reflector structure 10 constructed in accordance with the present invention is depicted in FIG. 1. The illustrative embodiment of the invention shown in FIG. 1 employs a plurality of quantum wells (only two of which, 12a and 12b, are shown) grown within an InP strain relief layer 14 that has, in turn, been grown on a quarter wave stack dielectric mirror structure 16. The mirror structure 16 is formed on a GaAs substrate 18 and, for illustrative purposes only, includes layers formed in the GaAs/AlAs semiconductor compound system.

Structure 10 was grown by Gas Source Molecular Beam Epitaxy (GSMBE) in which cracked $AsH_3$ and $PH_3$ were used as the Group V sources while the Group III sources were elemental in nature. On GaAs substrate 18 having a thickness of approximately 350 μm, the quarter wave stack dielectric mirror 16 was formed by growing thirty periods of alternating layers of GaAs and AlAs at a substrate temperature of 600 C under a V/III ratio of two. The illustrative Bragg reflector of FIG. 1 thus comprises a series of alternating material layers having different refractive indices. It can also be viewed as a plurality of pairs of layers wherein each pair of layers 20 includes one wide energy bandgap layer 20a and one narrow energy bandgap layer 20b. When the layers are arranged with individual layer thicknesses approximating a quarter wavelength (one quarter of an optical path length), the stack of layers will form a mirror of reflectivity approaching unity. For the arrangement of FIG.

1, the wide bandgap layers 20a are AlAs and the narrow bandgap layers 20b are GaAs. This system of layers is suitable for operation in the wavelength range around 1550 nm. Since the reflector is a standard quarter wave stack design, the optical thickness of each layer should be approximately one-quarter of the desired wavelength of operation. The reflector alone without the quantum well exhibits an intensity independent reflectivity and, if placed in a laser cavity, will not influence or induce modelocking.

A two step process, as widely employed for the heteroepitaxial growth of GaAs on Si, may be used to grow the InP strain relief layer 14 of the illustrative structure 10. For a detailed discussion of the two-step process for the GaAs on Si situation, reference may be had to a paper by J. E. Cunningham et al., entitled "Growth of GaAs on Si by Gas Source Molecular Beam Epitaxy for 850 nm Optical Interconnects", J. Vac. Sci. Technol. B 12,1 (1994). In accordance with an inventive adaptation of this two-step process, a first portion of strain relief layer 14 having, in the illustrative embodiment, a thickness of approximately 180 Å, is grown on the uppermost layer of the quarter wave stack structure 16.

During the growth of the first portion of strain relief layer 14, a sufficiently low temperature is maintained to produce an interface with the quarter wave stack that has a dislocation concentration of at least $1 \times 10^{5}/cm^{2}$ and preferably a concentration above $1 \times 10^{6}/cm^{2}$. The inventors herein have discovered that in sufficient concentration at the interface region, these dislocations act as non-radiative recombination sources. After saturation, these recombination sources remove carriers in the quantum well before the next round trip of the optical pulse arrives in the laser cavity. It may be possible that the presence of these recombination sources is also responsible for the ultra-fast response times that have been observed in experiments the inventors herein have conducted. Devices capable of such response times are believed to be of tremendous value as WDM sources in applications involving multi-wavelength communications.

For the illustrative structure of FIG. 1, an initial growth temperature of approximately 400° C. (as measured by a thermocouple placed behind the substrate holder) was employed. After growth of the first portion of strain relief layer 14, the growth temperature may be ramped up to a higher temperature selected so as to limit the recombination or migration of the dislocations that were previously developed in the interface region.

In the fabrication of the structure of FIG. 1, the temperature may be ramped to 520° C. until the InP layer achieves a thickness of approximately 300 angstroms. The structure is then annealed by ramping the temperature to approximately 650° C. and maintaining this temperature for 5 minutes under a $PH_3$ flow of 20 SCCM (standard cubic centimeters per minute). At the end of the anneal cycle, a clear (2×4) reconstruction becomes visible—indicating the formation of large domains of single crystal InP.

The substrate temperature is then reduced to 500° C. and growth of InP is resumed under conditions identical to those described by R. N. Pathak et al. in an article entitled "InGaAs-InP P-I (MQW)—N Surface Normal Electroabsorption Modulators Exhibiting Better Than 8:1 Contrast Ratio for 1.55 Micron Applications Grown by GSMBE", IEEE Phot. Tech. Lett. 6, 1439 (1994) in connection with the growth of high quality InP/InGaAs modulators. In accordance with an illustrative adaptation of this process used to produce the arrangement of FIG. 1, quantum well layers were grown at 500° C. with the indium growth rate set at 0.53 monolayers/second. The gallium growth rate was 0.50 monolayers/second to produce an indium mole fraction of 0.53. Arsenic and phosphorous fluxes were set to produce a group V/III ratio of 2:1. In this manner, InGaAs quantum well layers comprising an 8 nm thick layer of InGaAs 18 and a 10 nm thick layer of InP 20 were grown on strain relief layer 16. Growth of the QW structure was followed by an InP cladding layer 22 having a thickness selected to ensure a half wavelength strain relief layer structure.

Figure 2:
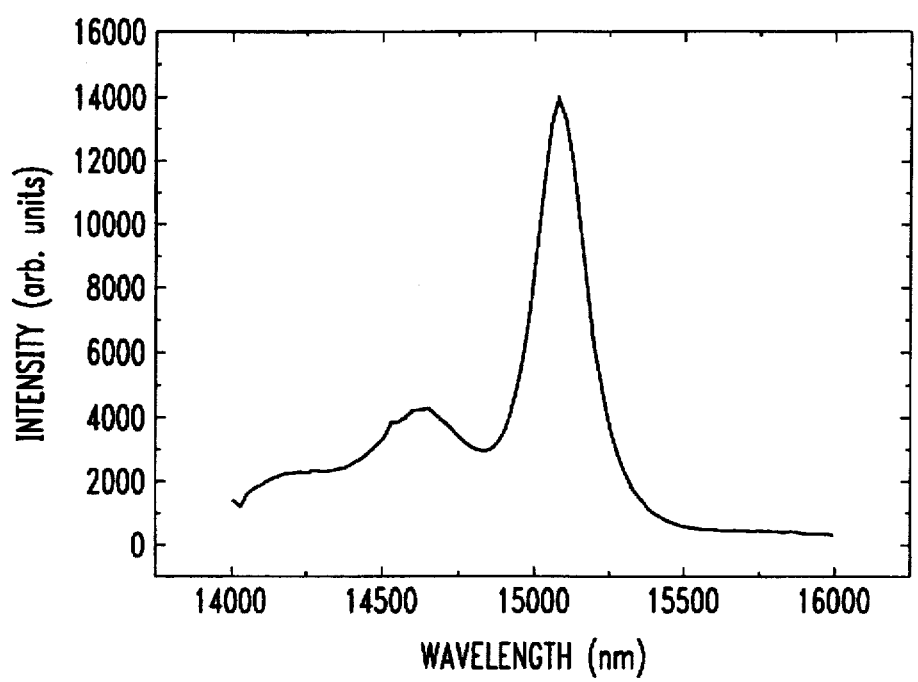
FIG. 2 is a plot depicting room temperature photoluminesence spectra exhibited by the structure of FIG. 1.
Figure 3:
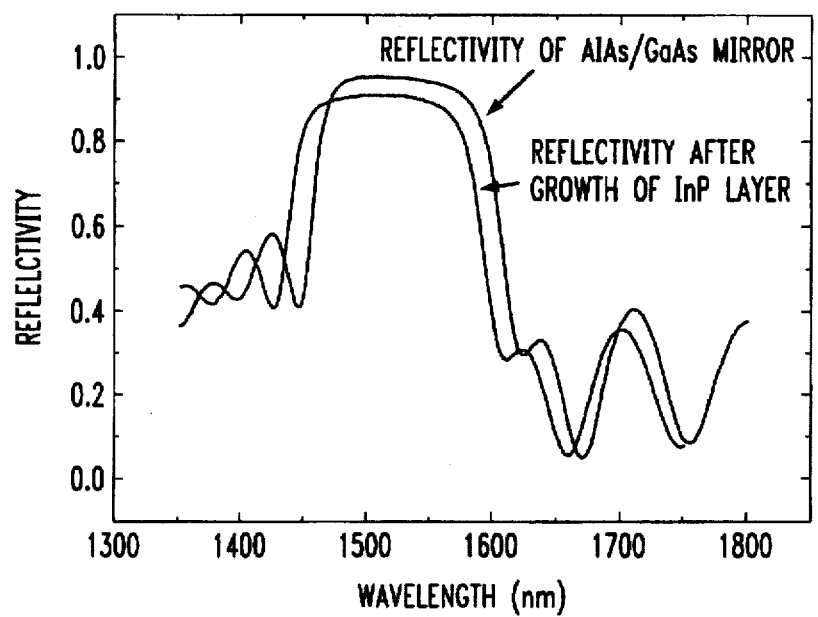
FIG. 3 is a plot comparing the reflectivity spectra of the AlAs/GaAs mirror and the completed structure of FIG. 1.

Sample structures grown in accordance with the aforementioned illustrative process were found to exhibit very intense photoluminescence. A typical room temperature PL spectra for the structure of FIG. 1 is shown in FIG. 2. The main peak is ascribed to excitonic recombination between the confined electron and heavy hole states while the smaller signal is probably due to the electron and light hole states. The FWHM of the main peak is found to be 12 meV, indicating that high quality QW growth was indeed achieved. The morphology was found to be highly specular under optical contrast microscopy with no visible indications of cross hatching due to strain relief. This is an important aspect of the inventive growth process since it minimizes any losses due to the scattering of incident light. Reflectivity measurements performed on the mirror stack before and after growth in an AVIV spectrometer are shown in FIG. 3. The accuracy of this instrument however is known to be 4–5 percent. More careful measurements performed within the cavity of a laser revealed a drop in reflectivity of less than 0.5% for the finished structure from that of the as grown mirror.

Figure 4A:
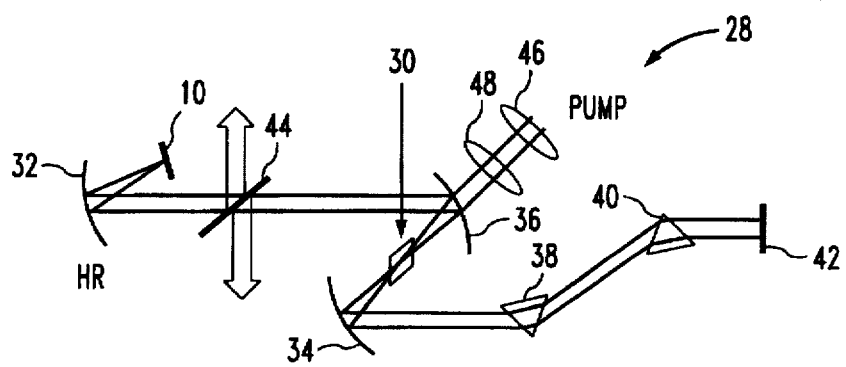
FIG. 4A is a schematic view of an illustrative $Cr^{4+}$:YAG laser arrangement passively modelocked by placing the structure of FIG. 1 within the laser cavity.

FIG. 4A shows the non-linear reflector structure 10 of FIG. 1 employed as a saturable absorber to mode lock a $Cr^{4+}$:YAG laser 28. The main laser cavity is formed between high reflectivity mirror 42 and reflector structure 10. As seen in FIG. 4A, the laser cavity is in an astigmatically compensated folded Z configuration. A Brewster cut 20×5 mm $Cr^{4+}$:YAG crystal rod 30 provides a optical gain medium for the modelocked laser. Mirrors 32, 34, 36, and 42 each have reflectivities centered about 1550 nm and each of folding mirrors 34 and 36 have a 10 cm radius of curvature. Folding mirrors 34 and 36 direct the optical signals through rod 30 as the gain medium. In one arm, two fused silica prisms 38 and 40 provide adjustable negative and positive dispersion which is used for pulse shaping. The saturable reflector structure 10 is placed substantially at the focal point of 10 cm radius curved high reflectivity mirror 32 and is mounted on a copper block to a spot of approximate diameter of 100 $\mu m^2$. Accordingly, mirror 32 focuses the cavity mode on the surface of non-linear reflector structure 10. A 4 µm pellicle 44 placed at near Brewster's angle in one arm provided a variable output coupler. An external Nd:YVO4 laser (not shown) supplied by Sprecta Physics was pumped by two 20 W diode arrays fiber coupled to the laser head. Two lenses 46 and 48 having focal lengths of 12 and 15 cm, respectively, are used for coupling the diffraction limited pump beam into the optical cavity through folding mirror 36.

Figure 4B:
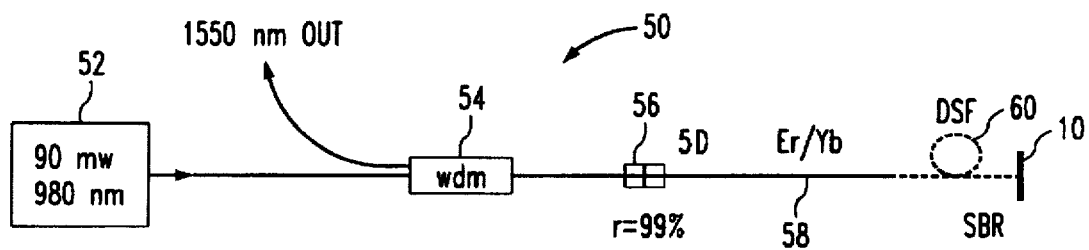
FIG. 4B is a schematic view of an illustrative Erbium-Ytterbium laser arrangement passively modelocked by placing the structure of FIG. 1 within the laser cavity.

The non-linear reflector structure 10 has also been successfully, employed as a saturable Bragg reflector to modelock a Er-Yb:fiber laser 50, as illustrated in FIG. 4B. An arrangement of this type is of particular interest as a possible broadband compact laser source for chirped pulse WDM transmission systems. In the illustrative arrangement of FIG. 4B, reflector structure 10 is inserted within the main cavity of the laser 50. A 90 mW 980 nm pump diode 52 is coupled through a wavelength division multiplexer 54, then through a rotary splice 56 that is coated with a coating that is 99% reflective to 1550 nm but transparent to 980 nm. A section of Er/Yb fiber 58 serves as the gain medium while a section of dispersion shifter fiber (DSF) 60 provides dispersion compensation. The fiber cavity terminates with non-linear reflector structure 10.

Figure 5:
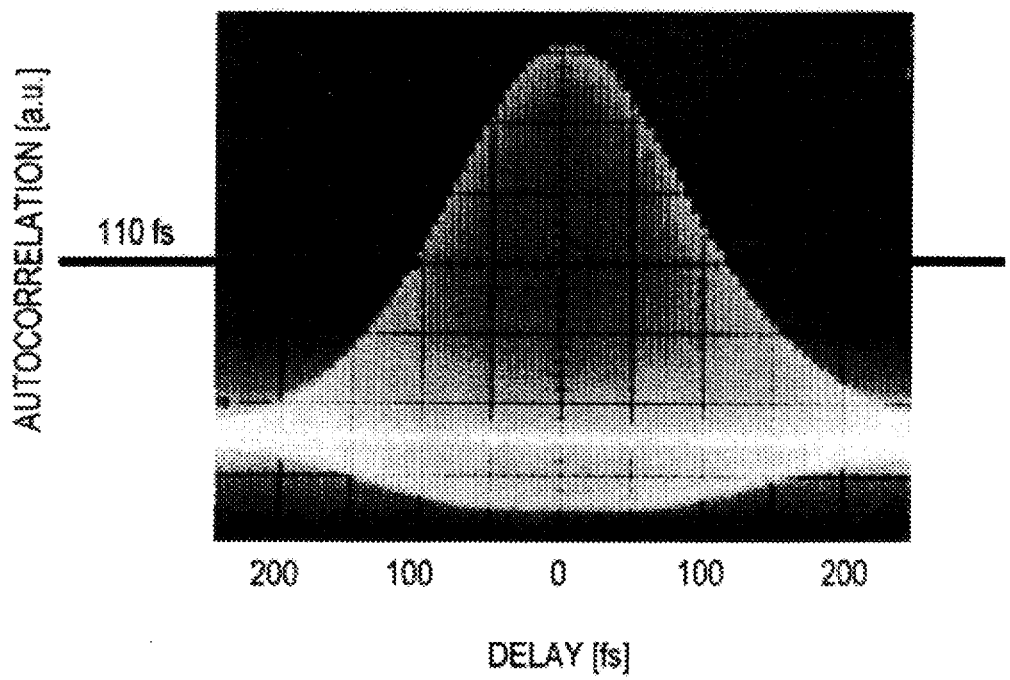
FIG. 5 is an autocorrelation trace obtained by modelocking the laser of FIG. 4A with the structure of FIG. 1, the modelocked pulse depicted showing FWHM of 110 fs.
Figure 6:
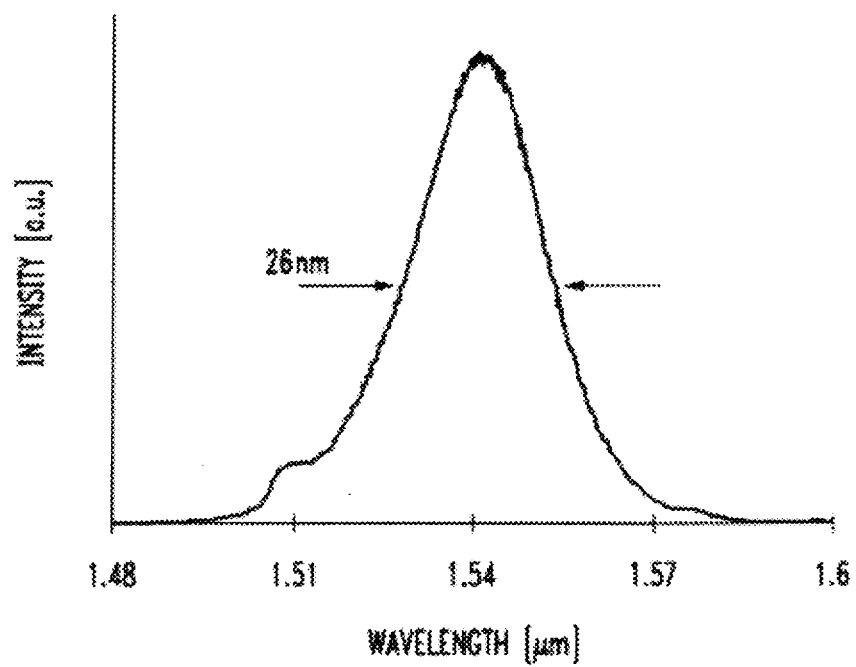
FIG. 6 is a plot depicting the spectrum of the modelocked pulse of FIG. 5.

Experimental data obtained during modelocked operation of the arrangement of FIG. 4A is depicted in FIGS. 5 and 6. Saturation of the saturable Bragg reflector 10 modelocks the laser in FIG. 4A which produces a modelock sequence of optical pulses. Pulsewidth is determined by dispersion and bandwidth limiting properties of the saturable Bragg reflector. The arrangement shown in FIG. 4A has been used to generate ultrashort optical pulses having a pulse autocorrelation of approximately 110 fs and a bandwidth of 26 nm centered about 1541 nm, as shown in FIGS. 5 and 6, respectively.

As shown in FIG. 1, the quantum well layer is grown in the strain relief layer 14. The mole fraction x for the quantum well is chosen so that the excitons are confined to a state below the bandgap of the narrow bandgap $In_xGa_{1-x}As$ layers in the Bragg reflector. In the example from experimental practice, a mole fraction less than x=0.53 is suitable for use. A quantum well thickness of approximately 60Å with a spacing of 70Å has been used in the experimental device with an exciton wavelength of approximately 1550 nm. The quantum wells were located 150Å from the surface of the half wavelength structure.

As noted by Knox in the above-identified patent application, in a saturable absorber structure, the thickness of the reflector layer which includes the quantum well can be maintained at its standard quarter wave thickness diminished by the quantum well thickness without any significant change in performance. That is, there is no need for a first approximation to account for the actual change in optical path length caused by the presence of the quantum well in the reflector layer. As such, the total thickness of the reflector layer together with the quantum well layer can be approximated with sufficiently good results by the quarter wave thickness of a standard reflector layer of the same material type without the quantum well.

It should be noted that the dispersion compensation provided by the Brewster prisms 38 and 40 can be removed from the laser cavity in the arrangement of FIG. 4A. In this case, pulsewidths of approximately 100 femtoseconds can be obtained from the laser. Self-starting for the modelocking process is readily obtained because the saturation nonlinearity is based upon energy of the incident radiation, not its intensity.

It is contemplated that the quantum wells can be grown at low temperature to produce a short response time for the device contemplated. It is understood that, while the Group III–V material system AlAs/GaAs is described above for fabricating the saturable Bragg reflector, other material combinations may be selected from other semiconductor Group III-V systems such as GaAs/InGaAs, InGaAs/InGaAlAs, InGaAs/InAlAs, GaAs/AlAs, GaAsSb/GaAlAsSb and InGaAsP/InP to realize the device. Finally, extension of the device structures to semiconductor compounds in Group II–VI and Group IV is also contemplated.

What is claimed is:

1. A dielectric mirror comprising a quarter-wave stack of dielectric material layers, an n half-wavelengths strain relief layer, where n is an odd integer greater than zero, and a quantum well layer within said strain relief layer so that said dielectric mirror provides a nonlinear saturation response to incident radiation.

2. The dielectric mirror as defined in claim 1 wherein the quarter-wave stack comprises a plurality of alternately wide and narrow bandgap semiconductor material layers.

3. The dielectric mirror as defined in claim 1, wherein the quarter wave stack is grown on GaAs and wherein said strain relief layer is InP.

4. The dielectric mirror as defined in claim 3 wherein the wide bandgap layers comprise AlAs and the narrow bandgap layers comprise GaAs.

5. The dielectric mirror as defined in claim 3, wherein an interface between said quarter wave stack and said strain relief layer defines a dislocation concentration greater than $1 \times 10^6 / cm^2$.

6. The dielectric mirror as defined in claim 3, wherein said strain relief layer is heteroepitaxially grown on an uppermost layer of said quarter wave stacks.

7. The dielectric mirror as defined in claim 1, wherein said strain relief layer comprises a semiconductor material that is lattice-mismatched to said quarter wave stack.

8. The dielectric mirror as defined in claim 1, wherein said strain relief layer comprises a semiconductor material that has been oxidized.

9. The dielectric mirror as defined in claim 1, wherein said strain relief layer comprises a semiconductor material that is lattice-mismatched to said quarter wave stack.

10. A laser for generating an optical beam at a first wavelength, said laser comprising first and second end reflectors and a gain medium, said second end reflector including a quarter-wave stack of dielectric material layers, an n half-wavelengths strain relief layer, where n is an odd integer greater than zero, and a quantum well layer within said strain relief layer so that said dielectric mirror provides a nonlinear saturation response to incident radiation in order to modelock said laser.

11. The laser as defined in claim 10, wherein the quarter-wave stack comprises a plurality of alternately wide and narrow bandgap semiconductor material layers.

12. The laser as defined in claim 10, wherein the quarter-wave stack is grown on GaAs.

13. The laser as defined in claim 10, wherein the wide bandgap layers comprise AlAs and the narrow bandgap layers comprise GaAs.

14. The laser as defined in claim 10, wherein the gain medium is includes an Erbium Ytterbium doped fiber.

15. The laser as defined in claim 10, wherein the dispersion medium includes a dispersion compensating fiber.

16. The laser as defined in claim 10, wherein the first wavelength is band-centered at 1550 nm.

17. The laser as defined in claim 10, further including an external pumping laser source.

18. The laser as defined in claim 10, wherein said external pumping laser source is a semiconductor diode laser.

19. A process for fabricating a dielectric mirror for providing a nonlinear saturation response to incident radiation, comprising the steps of:

forming a quarter-wave stack of dielectric material layers on a substrate;

heteroepitaxially growing an n half-wavelengths strain relief layer having at least one quantum well on an uppermost layer of said quarter wave stack, where n is an odd integer greater than zero.

20. The process as defined in claim 19, wherein the quarter-wave stack comprises a plurality of alternately wide and narrow bandgap semiconductor material.

21. The process as defined in claim 19, wherein the quarter wave stacks are grown on GaAs during said forming step.

22. The process as defined in claim 19, wherein the heteroepitaxial growing step includes:

growing a first portion of said strain relief layer at a first temperature sufficient to produce an interface with the quarter wave stack having a dislocation concentration of at least $1\times10^6/cm^2$.

23. The process as defined in claim 22, wherein the heteroepitaxial growing step further includes after producing said interface, continuing growth of said strain relief layer by gradually increasing the substrate temperature to a temperature sufficient to relieve substantially all strain during subsequent grown.

24. The process as defined in claim 23, wherein said substrate comprises GaAs, wherein said strain relief layer comprises InP and wherein the quarter wave stack comprises alternating layers of AlAs and GaAs.

* * * * *